Sept. 29, 1925.
H. ROSENBERG
COOKING UTENSIL
Filed July 28, 1924
1,555,484
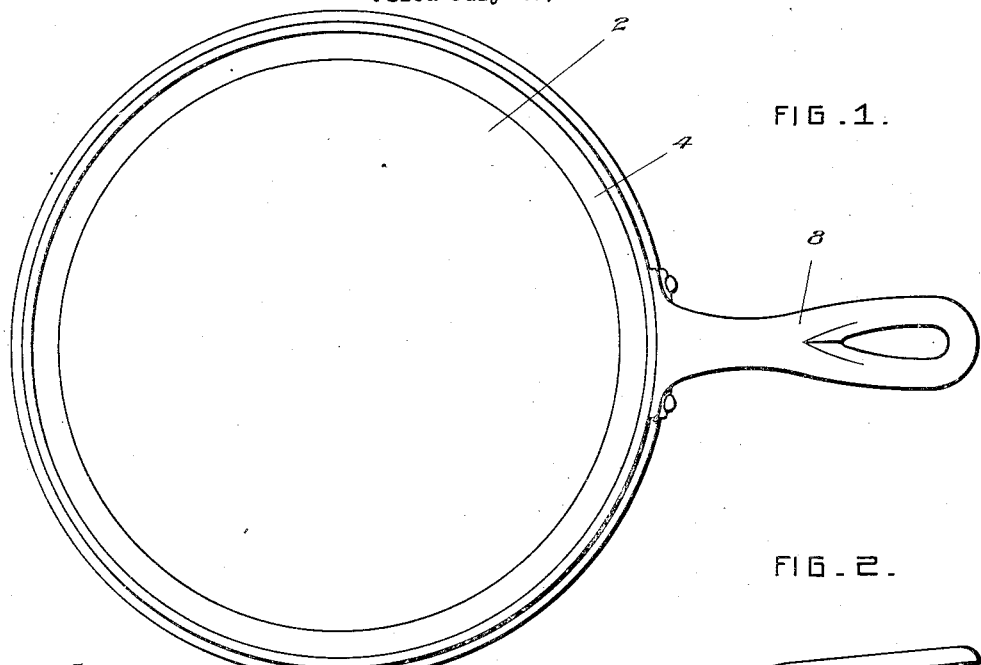
FIG. 1.
FIG. 2.
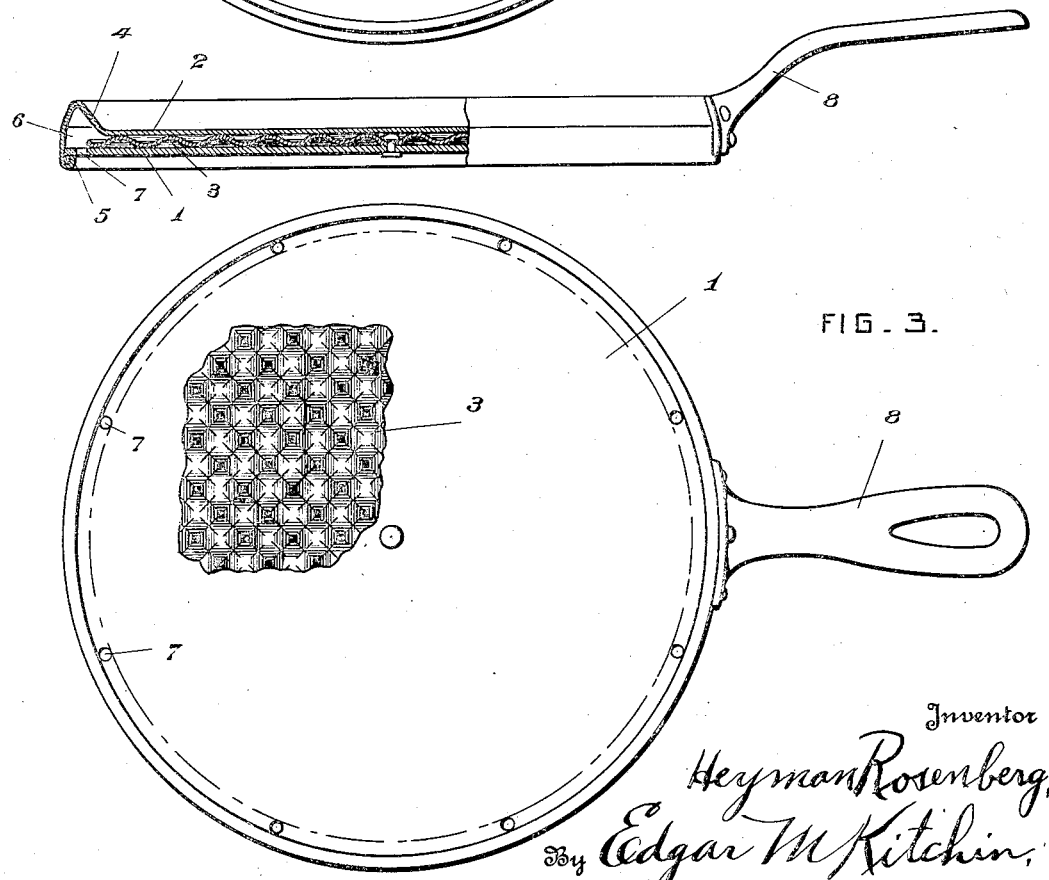
FIG. 3.
Inventor
Heyman Rosenberg,
By Edgar M Kitchin,
his Attorney.

Patented Sept. 29, 1925.

1,555,484

UNITED STATES PATENT OFFICE.

HEYMAN ROSENBERG, OF NEW YORK, N. Y.

COOKING UTENSIL.

Application filed July 28, 1924. Serial No. 728,772.

*To all whom it may concern:*

Be it known that I, HEYMAN ROSENBERG, a citizen of the United States, residing at New York, in the county of New York and State of New York, have invented certain new and useful Improvements in Cooking Utensils; and I do hereby declare the following to be a full, clear, and exact description of the invention, such as will enable others skilled in the art to which it appertains to make and use the same.

This invention relates to improvements in cooking utensils, and has for its primary object effective heat distribution.

A more detailed object is the uniform distribution of heat to remote areas not directly exposed to the source of heat.

With these and further objects in view as will in part hereinafter become apparent and in part be stated, the invention comprises certain novel constructions, combinations and arrangements of parts as subsequently specified and claimed.

In the accompanying drawings,—

Figure 1 is a plan view of a utensil embodying the features of the present invention, the embodiment in the selected instance being that of a griddle or frying pan.

Figure 2 is a view partly in side elevation and partly in vertical section.

Figure 3 is an inverted plan view, part of the bottom plate being broken out for disclosing a portion of the intermediate plate.

Referring to the drawings by numerals, 1 indicates a relatively heavy plate, preferably of steel, and 2 a plate spaced above the plate 1 and preferably of aluminum or other appropriate material. Interposed between the plates 1 and 2 is a heat-conducting plate 3, preferably of copper, and also preferably double corrugated; that is to say, the plate 3 has been passed one way through a corrugating machine to form the corrugations in one direction and then passed through the corrugating machine in the other direction to form corrugations at right angles to the first, whereby a series of cells is provided at each side of the plate 3. The plate 2 is flat like plate 1 for the greater portion of its area, but its marginal portion is stamped or otherwise formed into an annular upstanding portion 4, producing a receptacle. This receptacle will, of course, be made of such depth as is best adapted for the work to which it is to be put; as, for instance, a frying pan will be made deeper than a griddle. The material of plate 2 beyond the upstanding portion 4 is bent down again to contact with and surround the periphery of plate 1, and extends below the plate, and is again bent back at 5 and folded upon itself to form an annular seat against which the marginal portions of plate 1 rest. The thus-formed marginal portions of the plate 1, therefore, produce an annular housing or enclosed space 6 about the peripheral portion of the whole structure. This annular space 6 assists in the distribution of heat, and also assists in preventing radiation of the heat beyond the margin of the utensil. The plate 1 is preferably perforated at 7, 7, to permit influx and efflux of air to and from the space 6 with variations of temperature thereof. The plate 3, being an excellent conductor of heat, causes the heat to travel from any point at which it impinges on the plate 3 in all directions throughout the entire area of the plate to the periphery thereof. Loss by radiation at the periphery is prevented, however, by the presence of the space 6. The cellular formation incident to the corrugations and cross corrugations of plate 3 assists also in the uniformity of the distribution of the heat.

In operation, the utensil is located with the plate 1 immediately above the source of heat, and no matter to what extent such source may be concentrated at any particular area of plate 1, it is found by repeated successful experimenting that the construction just described effects such a distribution of the heat that cooking operation may be conducted at any place on the flat, exposed surface of plate 2 just as effectively as at any other point. Thermometer tests show that the heat of all parts of the flat surface of plate 2 is the same notwithstanding location of the utensil with the plate 1 subjected to a greater action at one place than at another. For instance, one experiment consisted of placing the utensil with one extreme portion or side over a gas flame while batter was placed on the other extreme portion or side, and a griddle cake was thus cooked without the slightest excess heating at one portion of the cake than at the other. The nearer portion of the cake apparently received no more heat than the more extreme portion.

As a matter of convenience, a handle 8 may be riveted or otherwise fixed to the utensil at any appropriate point and in any preferred manner. Also, the utensil itself is susceptible of substantial variations in proportions and contour without in the least departing from the spirit and scope of the invention.

The plate 1 serves in operation both to retain a substantial body of heat and also to protect the plate 3 against the eroding effect of the direct contact of the flame. The plates 1 and 3 also serve to protect the plate 2 against injury from excessive heating at any one spot, whereby the aluminum may be used for the plate 2 without fear of injury incident to warping or other deleterious effect of direct flame contact.

What is claimed is:—

1. A cooking utensil comprising a plate having a cooking surface, a heat-distributing plate beneath the first-mentioned plate, the second-mentioned plate being of material of high conductivity of heat, and a heat-receiving plate beneath said distributing plate, the intermediate plate being of material of higher conductivity than that of the other two plates.

2. A cooking utensil comprising a plate having a cooking surface, a heat-receiving plate beneath the first-mentioned plate, and a copper, heat-distributing plate interposed between said plates.

3. A cooking utensil comprising upper and lower plates, and an intermediate plate disposed between the upper and lower plates and possessing higher conductivity of heat than the upper plate.

4. A cooking utensil comprising a plate having a cooking surface, a heat-receiving plate beneath the first-mentioned plate, and a copper, heat-distributing plate interposed between said plates, the copper plate being corrugated.

5. A cooking utensil comprising a plate having a cooking surface, a heat-receiving plate beneath the first-mentioned plate, and a copper, heat-distributing plate interposed between said plates, the copper plate being formed with a series of air cells.

6. A cooking utensil comprising a plate having a cooking surface, a heat-receiving plate beneath the first-mentioned plate, and a copper, heat-distributing plate interposed between said plates, the copper plate being corrugated and cross-corrugated.

7. A cooking utensil comprising a plate having a cooking surface, a heat-receiving plate beneath the first-mentioned plate, a heat-distributing plate interposed between the two plates, and a housing surrounding the heat-receiving plate, the heat-distibuting plate terminating within the housing and the housing enclosing an air space at points about the heat-receiving and heat-distributing plates.

8. A cooking utensil comprising a plate having a cooking surface, and a copper, heat-distributing plate beneath the first-mentioned plate, the copper plate being a complete sheet of copper independent of and contacting with the under surface of the first-mentioned plate for distributing heat thereto.

In testimony whereof I affix my signature.

HEYMAN ROSENBERG.